(12) United States Patent
Chen et al.

(10) Patent No.: US 7,287,439 B2
(45) Date of Patent: Oct. 30, 2007

(54) APPARATUS FOR MEASURING TORQUE OF A TORQUE TOOL BY USING AN INDIRECT STRUCTURE

(75) Inventors: Chiu-Wang Chen, Huatan Shiang (TW); Tai-Kang Shing, Taipei (TW); Yung-Feng Nien, Taichung (TW); Shyuan-Yueh Lin, Banqiao (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/149,560

(22) Filed: Jun. 10, 2005

(65) Prior Publication Data

US 2006/0137470 A1 Jun. 29, 2006

(30) Foreign Application Priority Data

Dec. 29, 2004 (TW) ............................... 93141201 A

(51) Int. Cl.
 *B25B 23/142* (2006.01)
(52) U.S. Cl. .............................. 73/862.21; 73/862.191; 73/862.08
(58) Field of Classification Search ............. 73/862.21, 73/862.191, 862.08
 See application file for complete search history.

(56) References Cited

U.S. PATENT DOCUMENTS

| | | | |
|---|---|---|---|
| 3,970,155 A * | 7/1976 | Otto .......................... | 73/862.26 |
| 4,544,039 A * | 10/1985 | Crane .......................... | 173/182 |
| 4,751,452 A * | 6/1988 | Kilmer et al. .............. | 320/106 |
| 4,976,133 A * | 12/1990 | Pohl ............................ | 73/1.11 |
| 4,982,612 A * | 1/1991 | Rittmann .................. | 73/862.23 |
| 5,508,676 A * | 4/1996 | Grange et al. .................. | 338/2 |
| 6,571,179 B2 * | 5/2003 | Siegel .......................... | 702/33 |
| 7,000,508 B2 * | 2/2006 | Li et al. ....................... | 81/479 |
| 7,062,978 B1 * | 6/2006 | Hsien ...................... | 73/862.21 |
| 2006/0030062 A1 * | 2/2006 | He et al. ....................... | 438/18 |
| 2006/0070451 A1 * | 4/2006 | Walsh et al. .................. | 73/780 |
| 2006/0213275 A1 * | 9/2006 | Cobianu et al. .............. | 73/754 |

OTHER PUBLICATIONS

Vishay Micro Measurement Inc's Strain Gage Installation Accessories Listings. Obtained electronically on Oct. 14, 2006 from http://web.archive.org/web/20031011104447/http://www.vishay.com/brands/measurements_group/guide/a110/lists/ad_list.htm.*
M. Feil, C. Alder, G. Klink, M. König, C. Landesberger, S. Scherbaum, G. Schwinn, H. Spöhrle. "Ultra thin ICs and MEMS elements: techniques for wafer thinning, stress-free separation, assembly and interconnection." Microsystem Technologies 9 (2003): 179-182. Oct. 16, 2006 < http://www.springerlink.com/content/c3njd52f519awwkb/>.*

* cited by examiner

*Primary Examiner*—Michael Cygan
*Assistant Examiner*—Punam Patel
(74) *Attorney, Agent, or Firm*—Troxell Law Office, PLLC

(57) ABSTRACT

The invention provides an apparatus for measuring torque of a torque tool by using an indirect structure arranged on one side of the torque tool, in which the apparatus comprises a microstructure part connected with a side surface of the torque tool. The microstructure part further comprises a sensing structure for sensing the strain or displacement generated by a force exerted on the torque tool and converting the strain or displacement into an electrical signal. The electrical signal is then properly calibrated and processed for transforming units by a System-on-Chip (SoC), and converted into the torque value exerted by the user and the value is displayed on a display device.

20 Claims, 11 Drawing Sheets

$$C = \frac{\varepsilon_c A}{d'}$$

APPARATUS FOR MEASURING TORQUE OF A TORQUE TOOL BY USING AN INDIRECT STRUCTURE

FIELD OF THE INVENTION

The present invention relates to an apparatus for measuring torque of a torque tool by using an indirect structure, more particularly to an apparatus for measuring torque of a torque tool by using an indirect structure, in which a microstructure is arranged on the torque tool and the strain or displacement generated by a force exerted on the torque tool can be transferred into the microstructure to cause a strain or displacement of an internal sensing structure thereof.

BACKGROUND OF THE INVENTION

Based on the huge business opportunities brought by convenience of digitalization, electrical circuit and sensor are integrated on many traditional tools to display related data when using the tools. When using a traditional torque tool, such as a torque wrench, the extent of tightness of locking only can be determined by the user's experience and can not be judged by a reliable quantified data. Therefore, some wrenches with indication needles made by machinery, by which the user can see the quantity of the force exerted, appear in the market. However, the data shown on the indication needle sometimes can not be read easily and lacks flexibility of calibration. Further, records and statistics of the data can not be applied to match with digitalized integration thus the electronic and digitized tools are developed. The followings are some conventional electronic and digitized tools: (1) U.S. Pat. No. 3,970,155 disclosing an electronic torque wrench, in which a pair of strain gauges are attached with the torque wrench and a bridge circuit is electrically connected with the strain gauges such that the variations of the strain gauges can be measured by the bridge circuit. (2) U.S. Pat. No. 4,976,133 disclosing an apparatus for adjusting and calibrating a torque wrench, in which strain gauges attached with the torque wrench are also utilized to detect the force exerted on the torque wrench. (3) Taiwan Patent Publication No. 520,321 disclosing a wrench, in which strain gauges are arranged on both sides of the wrench and an integration device is arranged on the center of the wrench, the integration device is electrically connected with the strain gauges so as to detect strain variations of the strain gauges.

To sum up the above-mentioned prior arts, general drawbacks existed therein are described in the following. (a) Referring to FIG. 1, which is a diagram showing a prior art for measuring deform of main body of a torque tool. For example, a strain gauge 11$a$ is attached on the main body of a wrench 1$a$ to measure strain amount of the wrench. A strain variation is generated when a force is exerted on the wrench 1$a$, and a strain or a deform is also generated on the strain gauge 11$b$ of the deformed wrench 1$b$. According to the deform or displacement of the strain gauge 11$b$, the force exerted on the wrench can be known. According to FIG. 1, the strain amount $\epsilon = Mc/EI$, wherein $\epsilon$ is strain amount of the wrench, M is torque exerted on the wrench tool, c is distance from central axis to surface of the wrench, E is Young's modulus of the wrench, I is momentum of inertia of the wrench. Since the momentum of inertia and the Young's modulus of the wrench is large due to strengthened structural design for main body of the wrench tool it is hard to achieve a large strain amount $\epsilon$. (b) Two or four strain gauges are required to be attached on the main body of the wrench tool, thus the cost is increased and the production efficiency is decreased. (c) A complicated analog/digital circuit is utilized for controlling.

In view of the above-mentioned problems, an improved apparatus for measuring torque of a torque tool by using an indirect structure is required to solve the defects of the prior arts.

SUMMARY OF THE INVENTION

The primary objective of the present invention is to provide an apparatus for measuring torque of a torque tool by using an indirect structure, in which a single microstructure is arranged on the torque tool to achieve measuring a torque exerted on the torque tool.

The secondary objective of the present invention is to provide an apparatus for measuring torque of a torque tool by using an indirect structure, in which a single microstructure arranged on the torque tool is utilized to achieve reducing cost and decreasing operations of assembling thus production efficiency can be increased.

Another objective of the present invention is to provide an apparatus for measuring torque of a torque tool by using an indirect structure, in which the material, size and sensing position of a sensing structure arranged in the microstructure can be selected and adjusted to achieve larger deform of the sensing structure for increasing amplification factors.

Still another objective of the present invention is to provide an apparatus for measuring torque of a torque tool by using an indirect structure, in which strain variations or displacement of the sensing structure can be measured by way of its piezoresistive, piezoelectric, capacitive or inductive characteristics then converted into electrical signals to achieve larger output signals.

Yet another objective of the present invention is to provide an apparatus for measuring torque of a torque tool by using an indirect structure, in which the microstructure is electrically connected with a System-on-Chip to achieve simplifying circuit design, increasing reliability of products and convenience of assembling, and reducing cost.

To achieve the foregoing objectives, the present invention provides an apparatus for measuring torque of a torque tool by using an indirect structure arranged on one side of the torque tool, in which the apparatus comprises a microstructure connected with a side surface of the torque tool. The microstructure further comprises a sensing structure, which is above the side surface of the torque tool with a height, for sensing the strain or displacement generated by a force exerted on the torque tool and converting the strain or displacement into an electrical signal.

To achieve the above-mentioned objectives, the present invention further provides a torque tool comprising a main body, a microstructure part, a signal processing part, and an electrical power part. The main body comprises a tool head, a driving head and a handle body, wherein the driving head is arranged on the tool head and the handle body is connected with the tool head. The microstructure part is arranged on one side of the main body and further comprises a sensing structure, which is above the side surface of the torque tool with a height and capable of sensing the strain or displacement generated by a force exerted on the torque tool and converting the strain or displacement into an electrical signal. The signal processing part comprises a signal operator and a display, wherein the signal operator is electrically connected with the microstructure part, the display is electrically connected with the signal operator, and the signal operator is utilized for receiving the electrical signal and performing signal process. The electrical power part is arranged in the main body and capable of providing electrical power for the microstructure part and the signal processing part.

To make the examiner easier to understand the objectives, structure, innovative features, and function of the invention, preferred embodiments together with accompanying drawings are illustrated for the detailed description of the invention.

DESCRIPTION OF THE PREFERRED EMBODIMENT

Figure 1:
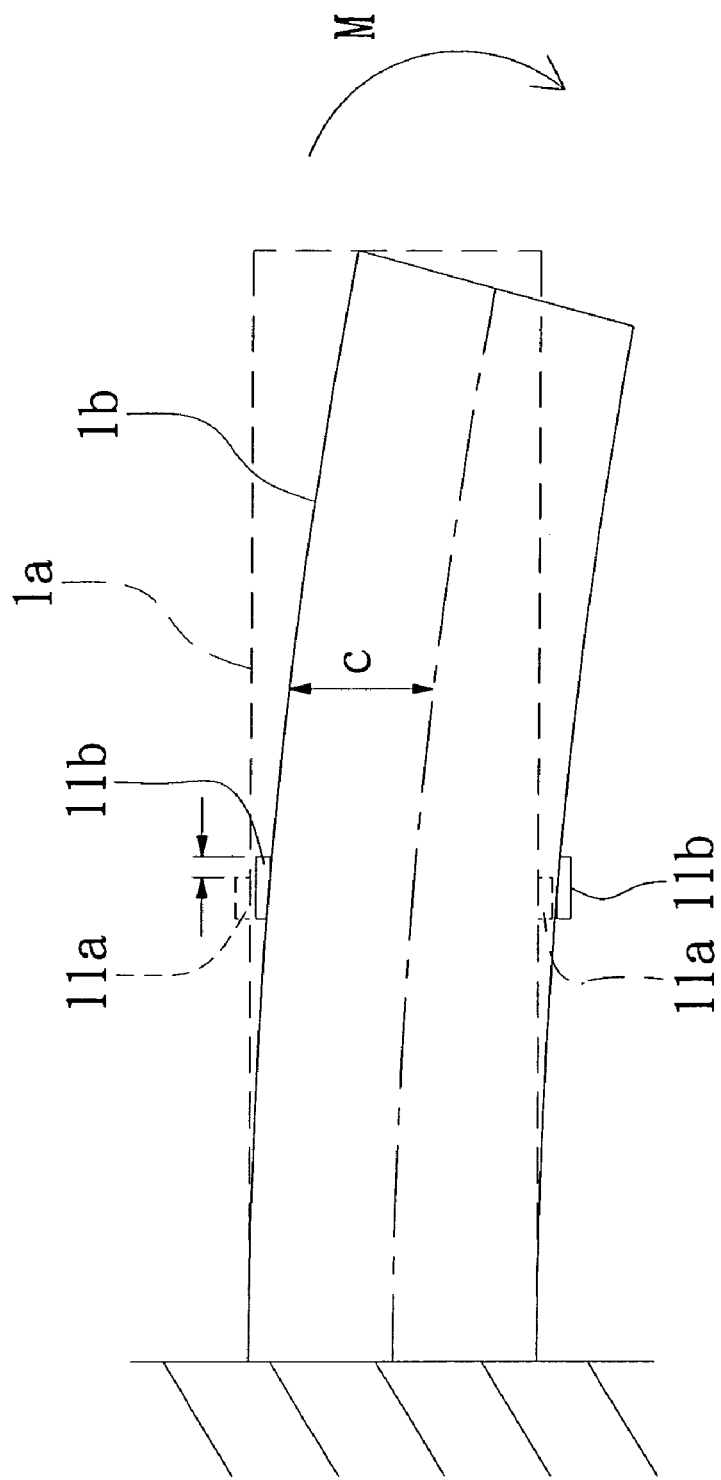
FIG. 1 is a diagram showing a prior art for measuring deform of main body of a torque tool.
Figure 2:
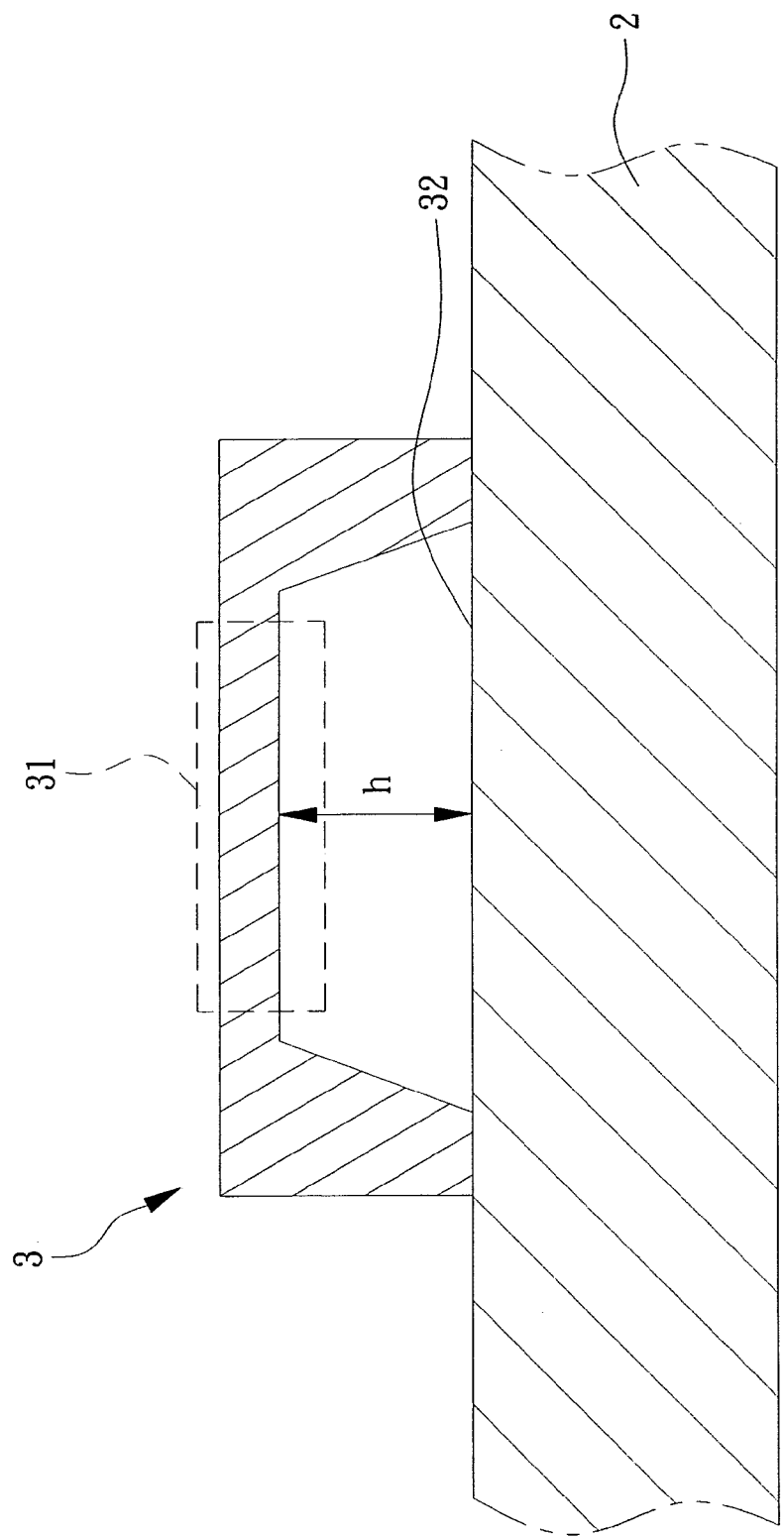
FIG. 2 is a cross sectional diagram of a microstructure part connecting with a main body of a torque tool of a first preferred embodiment of the present invention.

FIG. 2 is a cross sectional diagram of a microstructure part connecting with a main body of a torque tool of a first preferred embodiment of the present invention. The present invention provides an apparatus for measuring torque of a torque tool by using an indirect structure arranged on one side of the torque tool 2, in which the apparatus comprises a microstructure part 3 connected with a side surface of the torque tool 2. The microstructure part 3 further comprises a sensing structure 31, which is above the side surface of the torque tool 2 with a height h, for sensing the strain or displacement generated by a force exerted on the torque tool 2 and converting the strain or displacement into an electrical signal. A joint structure is arranged on the side surface of the torque tool for connecting with the microstructure part 3. In the embodiment, the joint structure is a processed plane 32 and the microstructure part 3 is adhered to the processed plane 32 by an adhesive material. The sensing structure 31 is a thin film structure. By way of the sensing structure 31, the microstructure part 3 indirectly measures the strain or displacement generated by a force exerted on the torque tool 2. The electrical signal corresponding to the strain or displacement can be amplified by selecting the size, shape design and material of the sensing structure 31 in cooperate with the height h. A mass production of the microstructure part 3 can be achieved by techniques of precise processing, Micro-Electro-Mechanical Systems (MEMS) technology and semiconductor manufacturing processes.

Figure 3A:
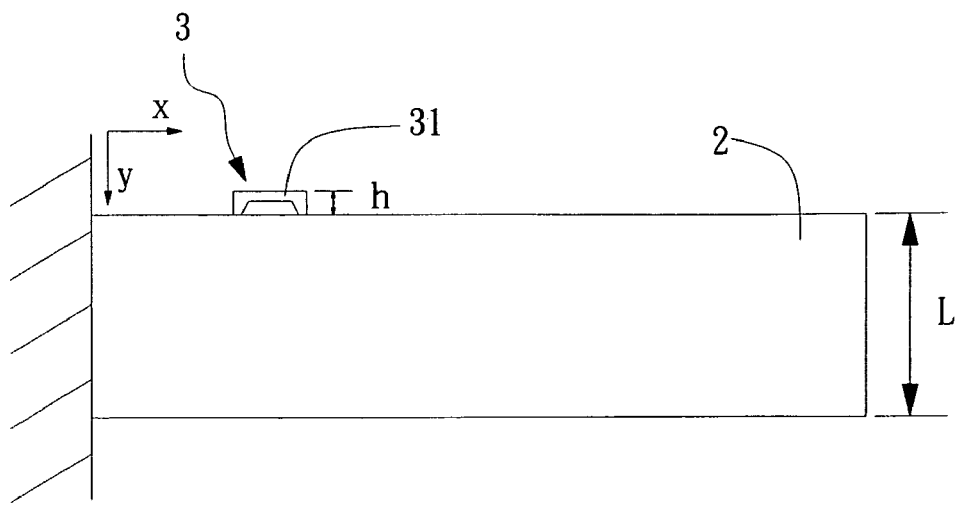
FIG. 3A-3B are diagrams depicting deform generated by a force exerted on a microstructure part connecting with a main body of the first preferred embodiment of the present invention.
Figure 3B:
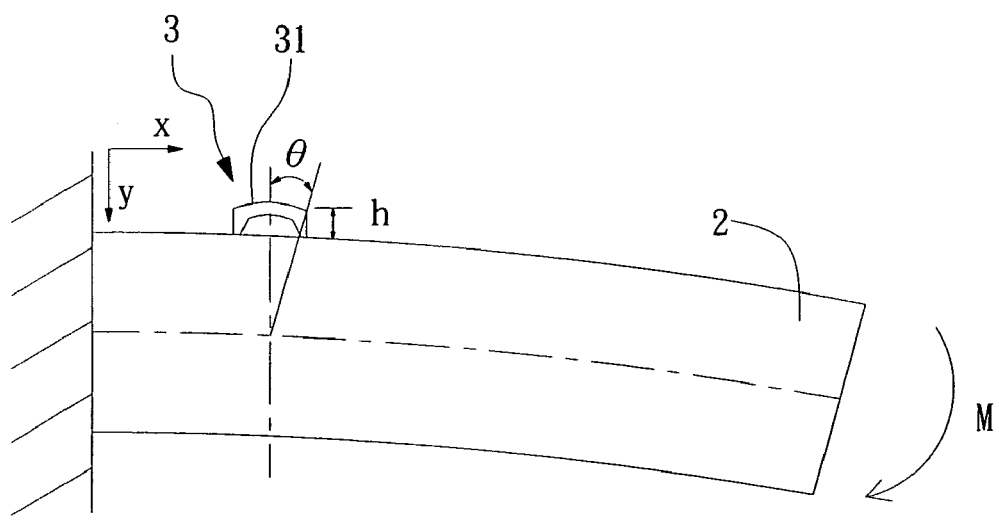

FIG. 3A and FIG. 3B are diagrams depicting deform generated by a force exerted on a microstructure part connecting with a main body of the first preferred embodiment of the present invention. FIG. 3A is a diagram showing the connecting relation between the microstructure part and the main body of the torque tool. Since one end of the main body is connected to a workpiece, the end can be regarded as a fixed end. A torque is generated on another end of the main body due to a force exerted thereon thus it can be regarded as a cantilever structure for simplifying analysis. When a torque M is applied on the main body of the torque tool 2, referring to FIG. 3B, a deform occurs on the main body of the torque tool 2 by the torque M. Since the sensing structure 31 is arranged at a height h above the surface of the main body of the torque tool 2, a deform amount $\epsilon 1$ caused by the force exerted on the torque tool 2 is amplified to $\epsilon 2$, wherein $$\epsilon 1 = (L/2)*\sin\theta \tag{1}$$

$$\epsilon 2 = (L/2+h)*\sin\theta \tag{2}$$

and L is the height of the torque tool 2, $\theta$ is the included angle between the normal state and the deformed state. By transferring the amplified deform amount $\epsilon 2$ into the microstructure part 3, thus a deform caused on the sensing structure 31. Since the sensing structure 31 is a thin film structure selected to be highly sensitive to displacement or strain variations, the original displacement or strain variations on the main body of the torque tool can be indirectly measured by measuring the displacement or strain variations caused on the sensing structure 31.

Figure 4:
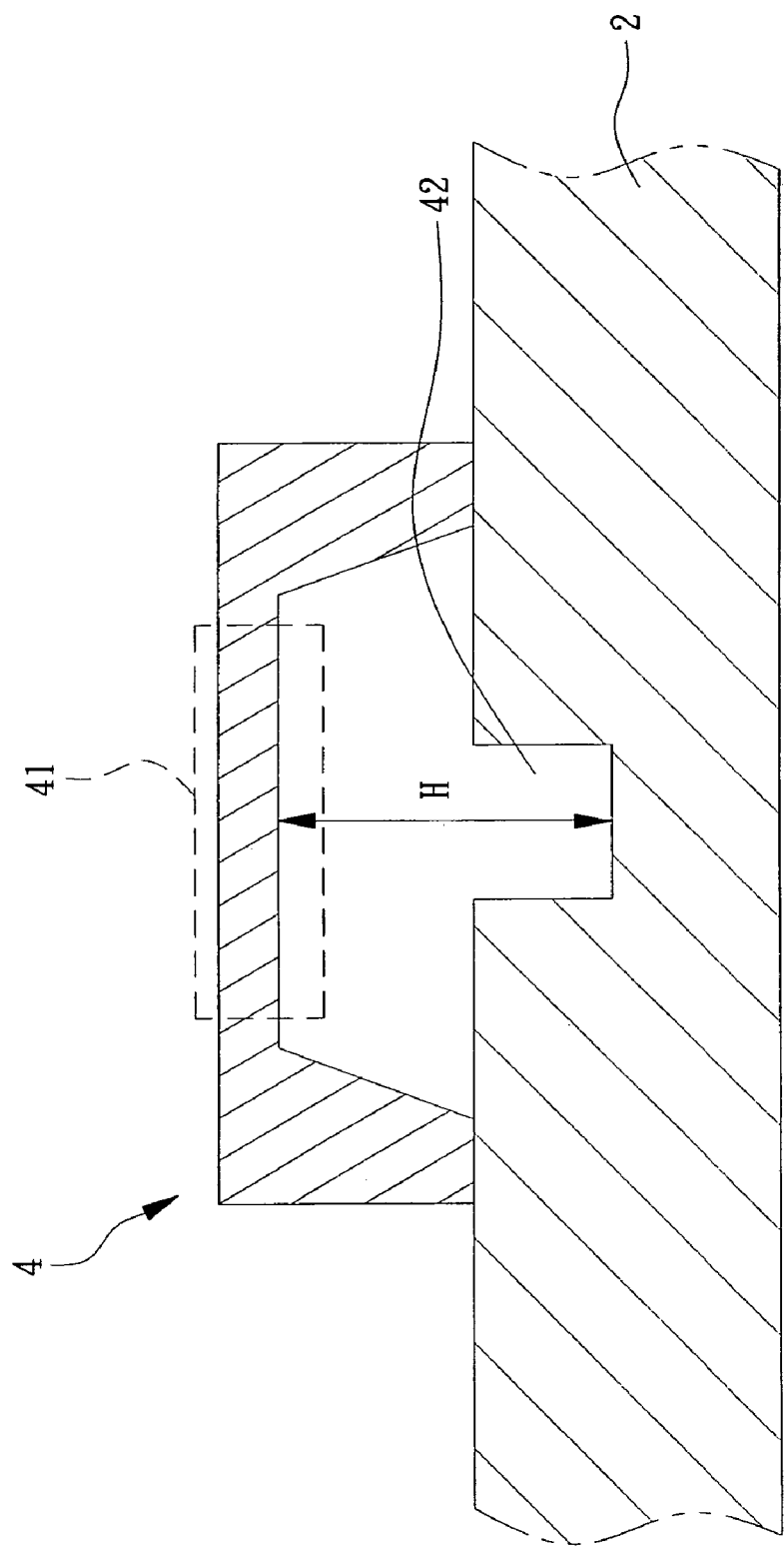
FIG. 4 is a cross sectional diagram of a microstructure part connecting with a main body of a torque tool of a second preferred embodiment of the present invention.

FIG. 4 is a cross sectional diagram of a microstructure part connecting with a main body of a torque tool of a second preferred embodiment of the present invention. The present invention provides an apparatus for measuring torque of a torque tool by using an indirect structure arranged on one side of the torque tool 2, in which the apparatus comprises a microstructure part 4 connected with a side surface of the torque tool 2. The microstructure part 4 further comprises a sensing structure 41, which is above the side surface with a height H, for sensing the strain or displacement generated by a force exerted on the torque tool 2 and converting the strain or displacement into an electrical signal. A joint structure is arranged on the side surface of the torque tool for connecting with the microstructure part 4. In the embodiment, the joint structure is a trench 42, which front and rear ends are connected with the microstructure part 4, and the microstructure part 4 is adhered to the front and rear ends of the trench 42 by an adhesive material. The sensing structure 41 is a thin film structure. A mass production of the microstructure part 4 can be achieved by techniques of precise processing, Micro-Electro-Mechanical Systems (MEMS) technology and semiconductor manufacturing processes.

Figure 5A:
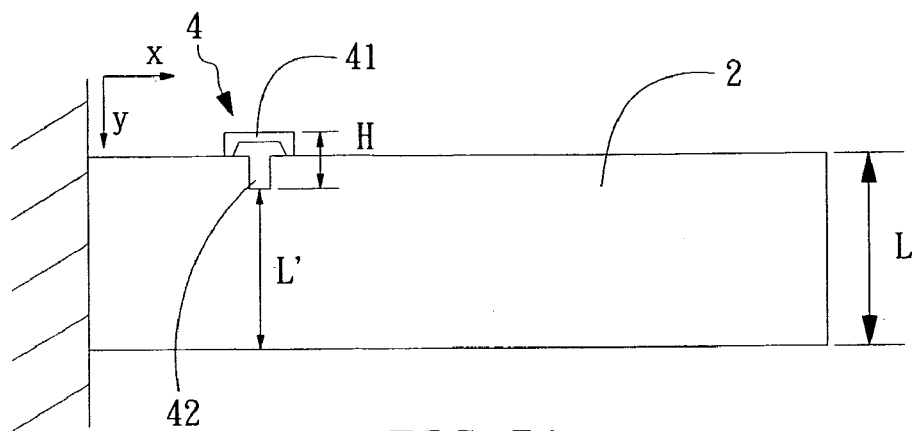
FIG. 5A-5C are diagrams depicting deform generated by a force exerted on a microstructure part connecting with a main body of the second preferred embodiment of the present invention.
Figure 5B:
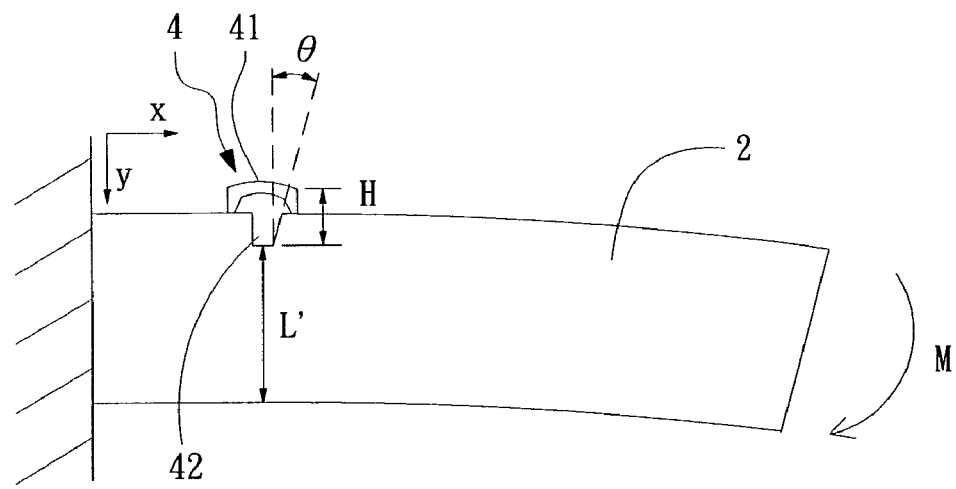
Figure 5C:
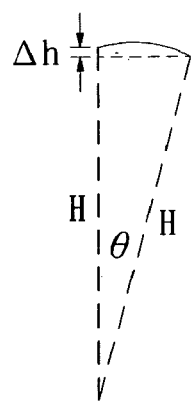

FIG. 5A and FIG. 5B are diagrams depicting deform generated by a force exerted on a microstructure part connecting with a main body of the second preferred embodiment of the present invention. FIG. 5A is a diagram showing the connecting relation between the microstructure part and the main body of the torque tool. Since one end of the main body is connected to a workpiece, the end can be regarded as a fixed end. A torque is generated on another end of the main body due to a force exerted thereon thus it can be regarded as a cantilever structure for simplifying analysis. When a torque M is applied on the main body of the torque tool 2, referring to FIG. 5B, a deform occurs on the main body of the torque tool 2 by the torque M. By way of the trench 42, the distance between the sensing structure and the surface of the torque tool is increased to a height H. When the torque is applied on the torque tool, in addition to occurring a deform in the X-axis expressed in equation (2), a similar deform Δh in the Y-axis also occurs on the sensing thin film 41, referring to FIG. 5C, wherein $$\Delta h = H^*(1-\cos\theta) \qquad (3)$$

Figure 6A:
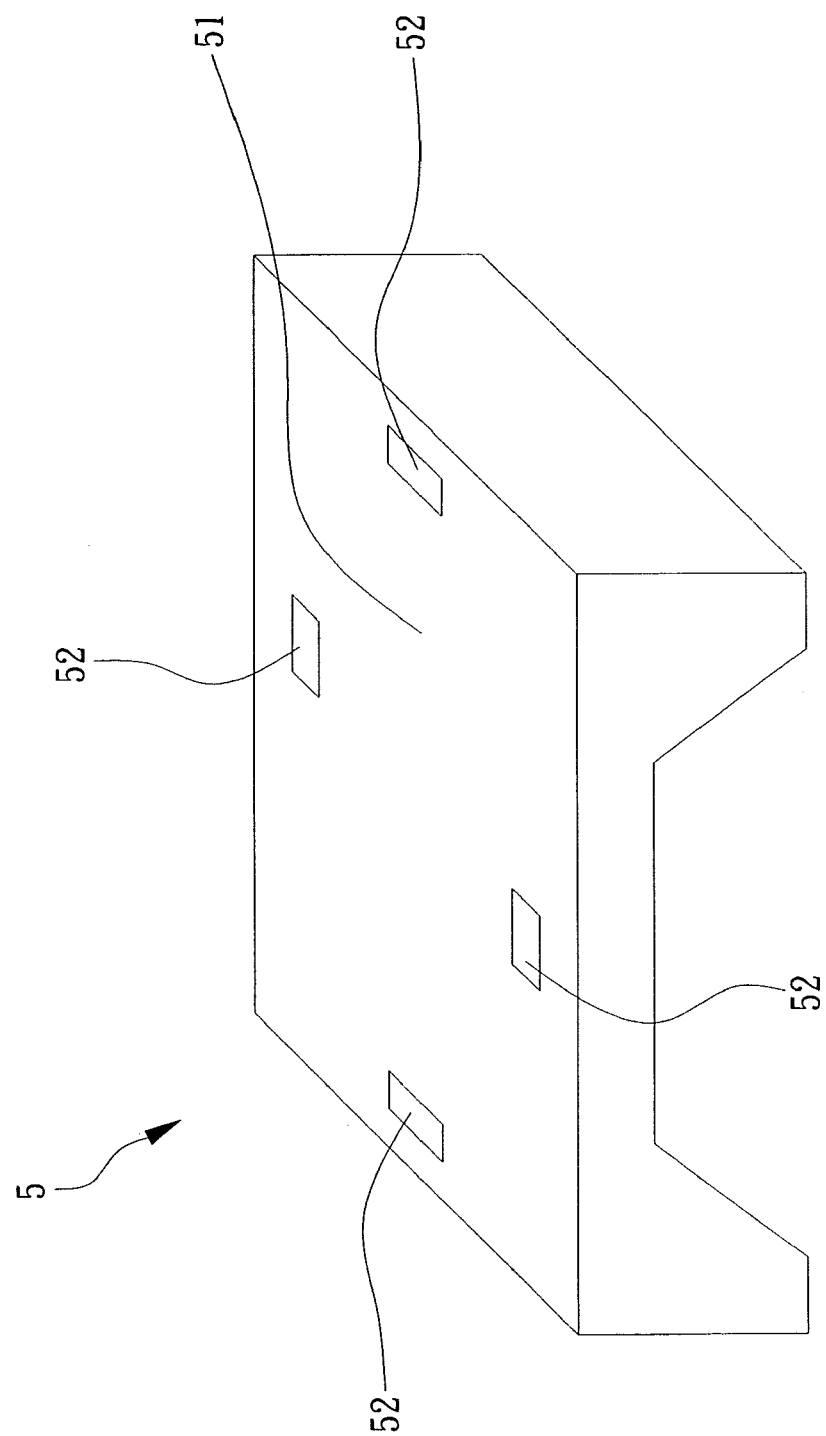
FIG. 6A is a diagram of the microstructure part of the first preferred embodiment of the present invention.
Figure 6B:
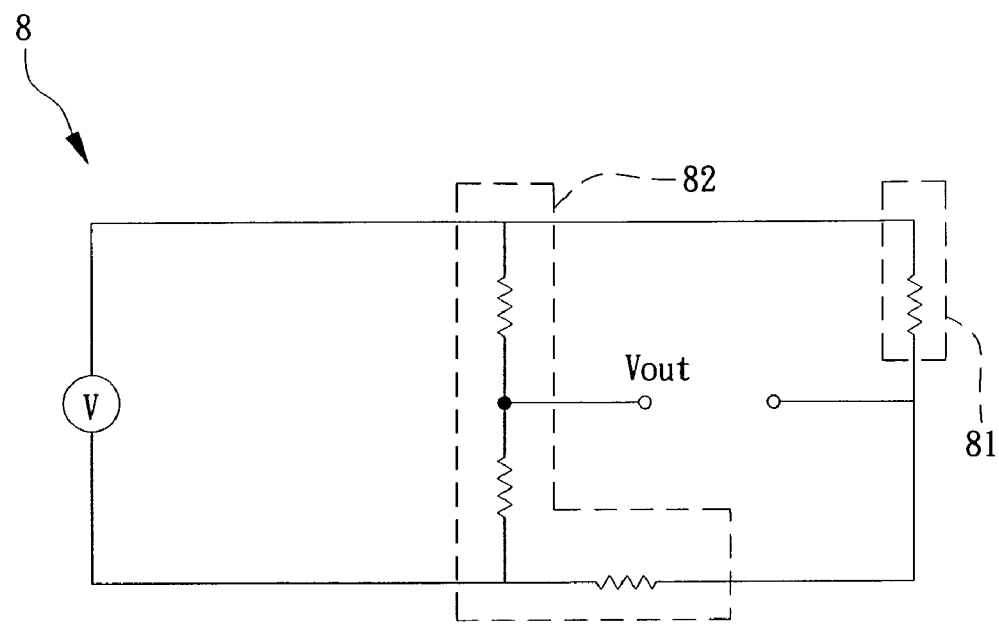
FIG. 6B is a diagram of the bridge circuit for measuring strain variations of the sensing structure.

FIG. 6A is a diagram of the microstructure part of the first preferred embodiment of the present invention. On a sensing structure 51 of a microstructure part 5, at least one sensing body 52 is arranged. The sensing body 52 can be made of a strain gauge or a piezoresistive material, and the piezoresistive material can be manufactured by semiconductor processes. FIG. 6B is a diagram of a bridge circuit for measuring strain variations of the sensing structure. The sensing structure is connected to a bridge circuit 8, which comprises a sensing resistor 81 and three external resistors 82, wherein the sensing resistor 81 is the sensing body 52 shown in FIG. 6A. By way of the strain variation generated on the sensing structure in FIG. 6A, the resistance of the sensing body 52 is varied and the resistance variation of the sensing body 52 is converted into an electrical signal (Vout in FIG. 6B) by the bridge circuit 8. The bridge circuit 8 is a quarter bridge circuit in the embodiment. To comply with the number of the sensing bodies arranged thereon, a full or a half bridge circuit will be utilized to analyze the resistance variations of the sensing body 52 due to strain variations thereof.

Figure 6C:
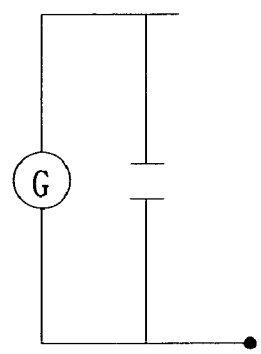
FIG. 6C is a diagram of an equivalent circuit of the microstructure part of the second preferred embodiment of the present invention.

In addition to passive elements such as a strain gauge or a piezoresistive material, the sensing body shown in FIG. 6A can also be made of a piezoelectric material as shown in FIG. 6C, which is a diagram of an equivalent circuit of the microstructure part of the second preferred embodiment of the present invention. The piezoelectric material can be manufactured by semiconductor processes. When a deform occurs on the sensing structure so as to compress or stretch the piezoelectric material, a corresponding electrical signal output is generated by way of piezoelectric effect.

Figure 7A:
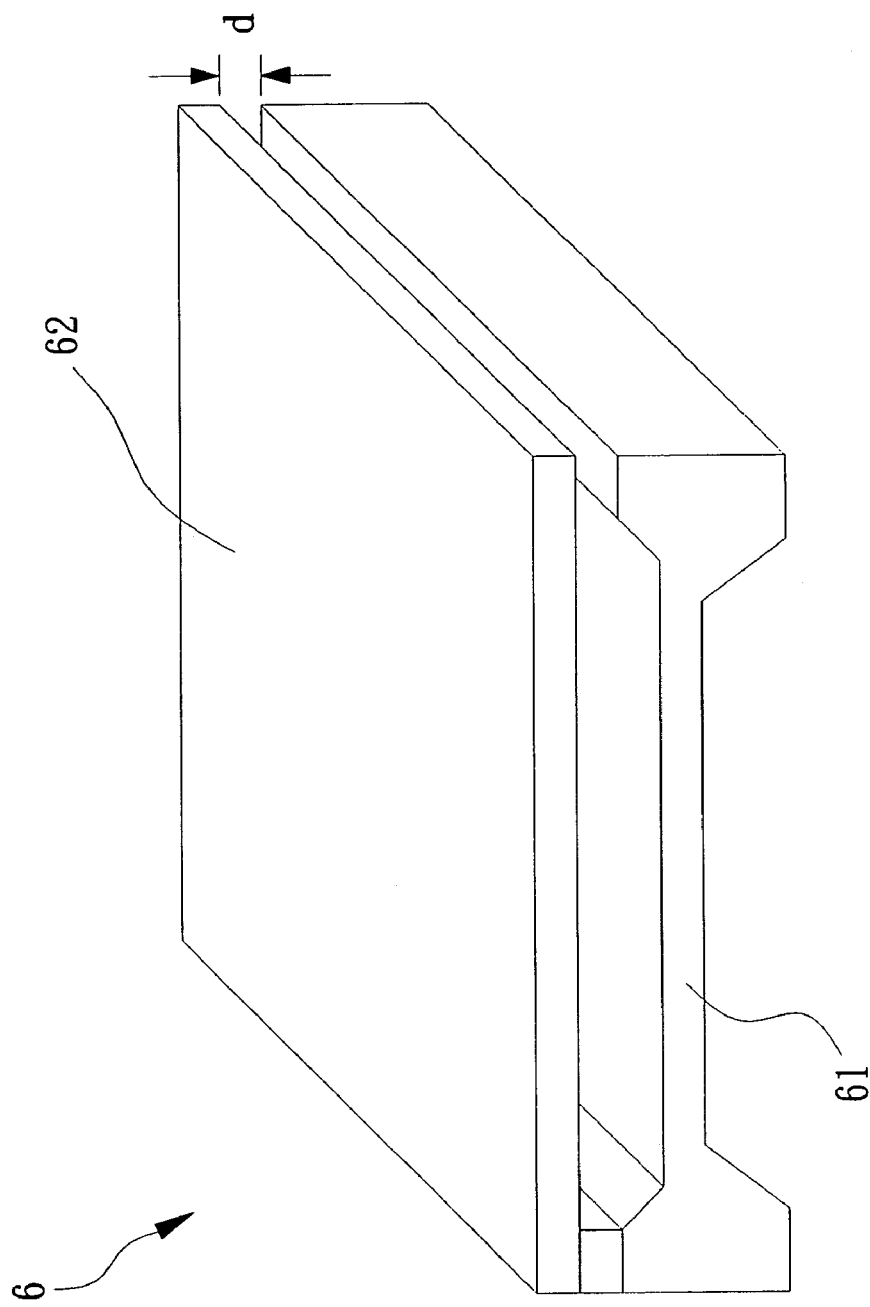
FIG. 7A-7C are diagrams of structure and equivalent circuit of the microstructure part of the third preferred embodiment of the present invention.
Figure 7B:
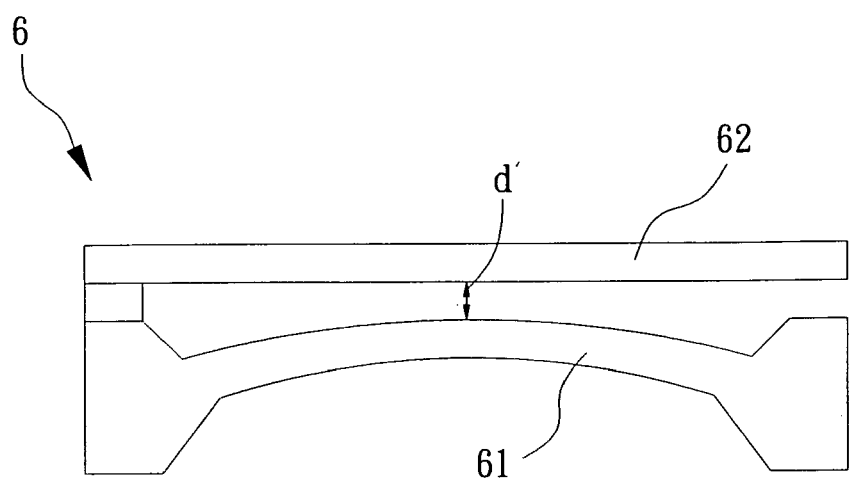
Figure 7C:
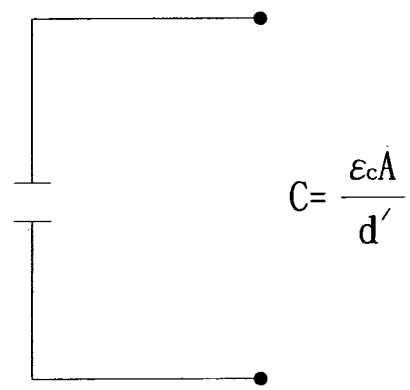

FIG. 7A-7C are diagrams of structure and equivalent circuit of the microstructure part of the third preferred embodiment of the present invention. Referring to FIG. 7A, a microstructure part 6 comprises a sensing structure 61 and a parallel plate 62, wherein the parallel plate 62 is at a distance d away from the sensing structure 61. By providing electric power to the microstructure part 6, a capacitance C is formed between the sensing structure 61 and the parallel plate 62, wherein $$C = \epsilon c\, A/d \qquad (4)$$

and ϵ c is dielectric constant, d is the distance between the parallel plate 62 and the sensing structure 61, A is the area of the parallel plate 62. Referring to FIG. 7B, the distance d between the sensing structure 61 and the parallel plate 62 is changed to d' when a deform or strain occurs on the sensing structure 61. Thus, the capacitance C is varied due to the gap distance variation by equation (4). By measuring the capacitance variation caused by the strain variation, a corresponding electrical signal output is generated, referring to FIG. 7C. FIG. 7C is an equivalent circuit diagram of the microstructure part.

Figure 8:
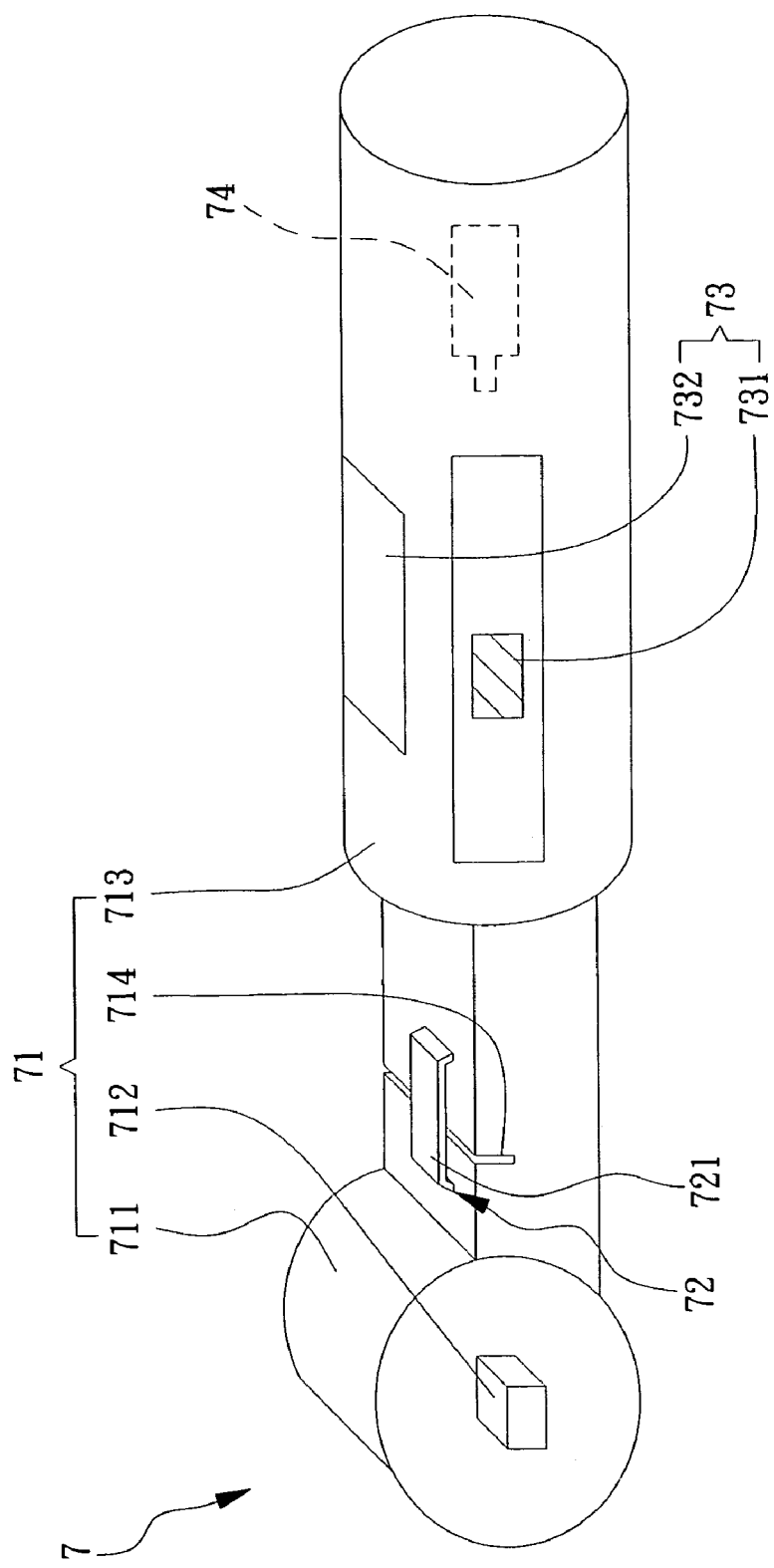
FIG. 8 is a diagram of a torque tool of the present invention.

FIG. 8 is a diagram of a torque tool of the present invention. The torque tool 7 comprises a main body 71, a microstructure part 72, a signal processing part 73, and an electrical power part 74. The main body 71 comprises a tool head 711, a driving head 712, a handle body 713, and a trench 714, wherein the driving head 712 is arranged on the tool head 711 and the handle body 713 is connected with the tool head 711. The driving head 712 is capable of connecting with various tools, such as a hexagonal wrench and a socket wrench. The microstructure part 72 is arranged on one side surface of the handle body 713 and near the tool head 711, and the microstructure part 72 is connected with two ends of the trench 714. The microstructure part 72 further comprises a sensing structure 721, which is above the side surface of the torque tool 7 with a height and capable of sensing the strain or displacement generated by a force exerted on the torque tool and converting the strain or displacement into an electrical signal.

The signal processing part 73 is electrically connected with the microstructure part 72, and the signal processing part 73 is capable of receiving the electrical signal and performing signal process. The signal processing part 73 comprises a signal operator 731 and a display 732, wherein the signal operator 731 is electrically connected with the microstructure part 72 and the display 732 is electrically connected with the signal operator 731. The display 732 is a display device selected from a liquid crystal display or a display formed by light emitting diodes. The electrical power part 74 is arranged in the main body 71 and capable of providing electrical power for the torque tool 7.

Figure 9:
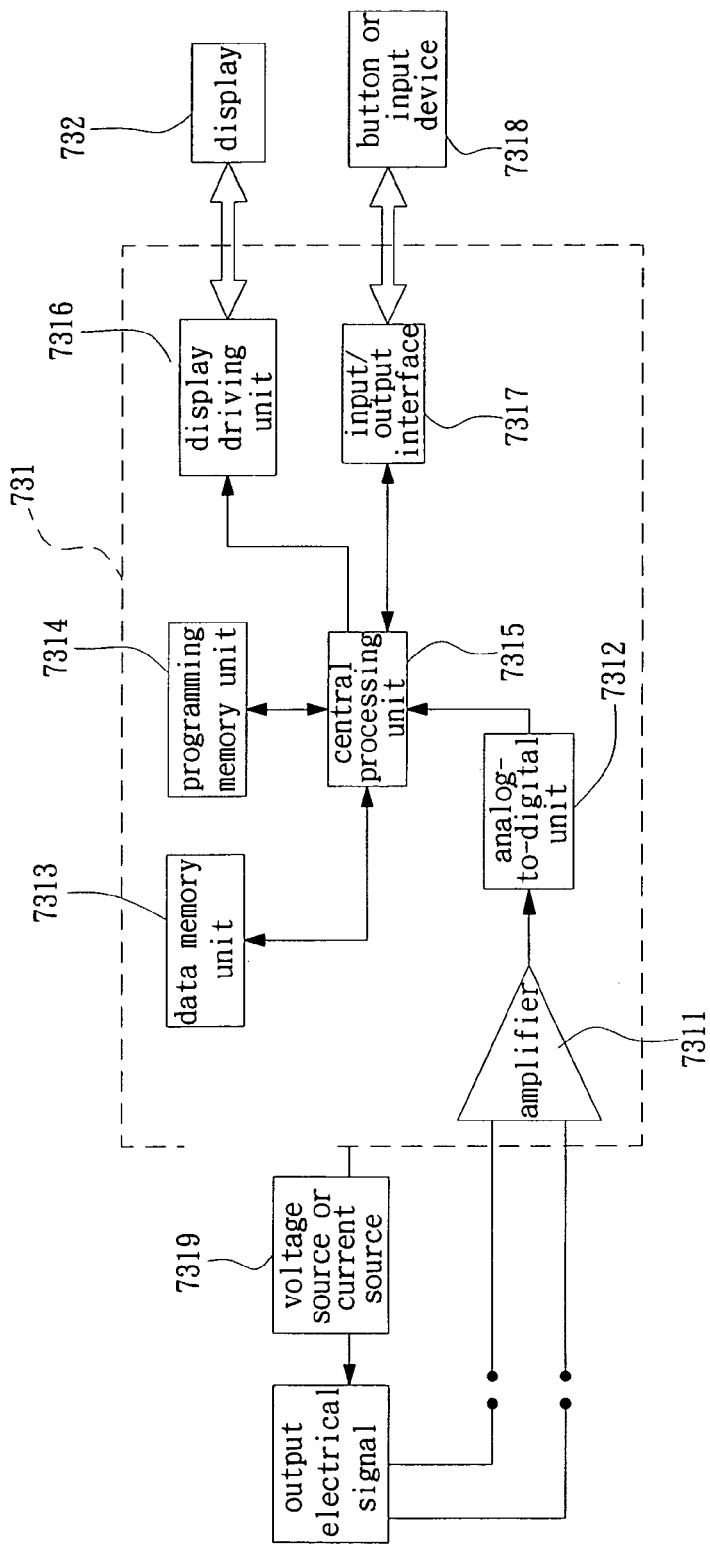
FIG. 9 is a diagram of a framework for processing electrical signal in the present invention.

FIG. 9 is a diagram of a framework for processing electrical signal in the present invention. For simplifying the signal processing circuit and reducing the cost, the signal operator 731 can be selected as a System-on-Chip (SoC). The signal operator 731 integrates an amplifier 7311, an analog-to-digital unit 7312, a data memory unit 7313, a programming memory unit 7314, a central processing unit 7315, a display driving unit 7316, and an input/output interface 7317 in a single chip. The present invention utilizes the integrated signal operator 731 as a controlling center, and the signal operator 731 provides a voltage source or a current source 7319 for the microstructure part 72. When the above-mentioned electrical signal is generated, the electrical signal is sent into the signal operator 731 and is amplified by the amplifier 7311, converted by the analog-to-digital unit 7312, then the converted signal or data is displayed on the display 732 after proper calibration and compensation. The present invention also provides button or input device 7318 for sending data into the central processing unit 7315 for processing through the input/output interface 7317. The controlling and computing of the signal operator 731 are all controlled by the central processing unit 7315, and the data and the firmware program utilized therein are stored in the memory units 7313 and 7314 of the signal operator 731.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An apparatus for measuring torque of a torque tool by using an indirect structure arranged on one side of the torque tool, comprising:

a microstructure part connected with a side surface of the torque tool, the microstructure part further comprises a sensing structure for sensing the strain or displacement generated by a force exerted on the torque tool and converting the strain or displacement into an electrical signal, wherein a joint structure is further arranged on the side surface for connecting with the microstructure part, wherein the joint structure is a trench, and front and rear ends of the trench are connected with the microstructure part.

2. The apparatus for measuring torque of a torque tool by using an indirect structure of claim 1, wherein the microstructure part is adhered to the side surface by an adhesive material.

3. The apparatus for measuring torque of a torque tool by using an indirect structure of claim 1, wherein the sensing structure is a thin film structure.

4. The apparatus for measuring torque of a torque tool by using an indirect structure of claim 1, wherein the sensing structure is connected to a bridge circuit, the bridge circuit comprises at least one sensing body arranged on the sensing structure and external resistors and is utilized for converting the resistance variation caused by the strain variation generated on the sensing structure into an electrical signal.

5. The apparatus for measuring torque of a torque tool by using an indirect structure of claim 4, wherein the sensing body is made of a strain gauge or a piezoresistive material.

6. The apparatus for measuring torque of a torque tool by using an indirect structure of claim 1, wherein the sensing body is made of a piezoelectric material by semiconductor processes such that a corresponding electrical signal is generated by way of piezoelectric effect when a deformation occurs on the sensing structure and compresses or stretches the piezoelectric material.

7. The apparatus for measuring torque of a torque tool by using an indirect structure of claim 1, wherein a parallel plate is arranged on one side of the sensing structure to form a sensing capacitor such that a corresponding electrical signal is generated when a deformation occurs on the sensing structure and causes a capacitance variation of the sensing capacitor.

8. The apparatus for measuring torque of a torque tool by using an indirect structure of claim 1, further comprising a signal processing part electrically connected with the microstructure part, the signal processing part is capable of receiving the electrical signal and performing signal process.

9. The apparatus for measuring torque of a torque tool by using an indirect structure of claim 8, wherein the signal processing part comprises a signal operator and a display, and the signal operator is electrically connected with the microstructure part and the display is electrically connected with the signal operator.

10. The apparatus for measuring torque of a torque tool by using an indirect structure of claim 9, wherein the signal operator is a System-on-Chip (SoC).

11. The apparatus for measuring torque of a torque tool by using an indirect structure of claim 1, wherein the sensing structure is arranged above the side surface with a height.

12. A torque tool, comprising:
a main body, the main body comprises a tool head, a driving head, and a handle body, wherein the driving head is arranged on the tool head and the handle body is connected with the tool head;

a microstructure part, the microstructure part is arranged on one side surface of the main body, and the microstructure part further comprises a sensing structure for sensing the strain or displacement generated by a force exerted on the torque tool and converting the strain or displacement into an electrical signal;

a signal processing part, the signal processing part comprises a signal operator and a display, wherein the signal operator is electrically connected with the microstructure part and the display is electrically connected with the signal operator, and the signal processing part is capable of receiving the electrical signal and performing signal process; and an electrical power part, the electrical power part is arranged in the main body and is capable of providing electrical power for the microstructure part and the signal processing part, wherein a joint structure is further arranged on the side surface for connecting with the microstructure part, wherein the joint structure is a trench, and front and rear ends of the trench are connected with the microstructure part.

13. The torque tool of claim 12, wherein the sensing structure is connected to a bridge circuit, the bridge circuit comprises at least one sensing body arranged on the sensing structure and external resistors and is utilized for converting the resistance variation caused by the strain variation generated on the sensing structure into an electrical signal.

14. The torque tool of claim 13, wherein the sensing body is made of a strain gauge or a piezoresistive material.

15. The torque tool of claim 12, wherein the sensing body is made of a piezoelectric material by semiconductor processes such that a corresponding electrical signal is generated by way of piezoelectric effect when a deformation occurs on the sensing structure and compresses or stretches the piezoelectric material.

16. The torque tool of claim 12, wherein a parallel plate is arranged on one side of the sensing structure to form a sensing capacitor such that a corresponding electrical signal is generated when a deformation occurs on the sensing structure and causes a capacitance variation of the sensing capacitor.

17. The torque tool of claim 12, wherein the microstructure part is adhered to the side surface by an adhesive material.

18. The torque tool of claim 12, wherein the sensing structure is a thin film structure.

19. The torque tool of claim 12, wherein the signal operator is a System-on-Chip (SoC).

20. The torque tool of claim 12, wherein the sensing structure is arranged above the side surface with a height.

* * * * *